(12) United States Patent
Bae et al.

(10) Patent No.: US 9,202,429 B2
(45) Date of Patent: Dec. 1, 2015

(54) THREE-DIMENSIONAL IMAGE DISPLAY DEVICE AND DRIVING METHOD THEREOF

(71) Applicant: Samsung Display Co., Ltd., Yongin, Gyeonggi-Do (KR)

(72) Inventors: Hyeon Seok Bae, Suwon-si (KR); Haeng Won Park, Seongnam-si (KR); Duck Yong Ahn, Suwon-si (KR); Min Jun Choi, Daejeon (KR); Joo Young Choi, Chungcheongnam-do (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/293,955

(22) Filed: Jun. 2, 2014

(65) Prior Publication Data

US 2015/0206496 A1    Jul. 23, 2015

(30) Foreign Application Priority Data

Jan. 20, 2014    (KR) ........................ 10-2014-0006908

(51) Int. Cl.
*G06F 3/01*    (2006.01)
*G09G 3/36*    (2006.01)
*G09G 3/32*    (2006.01)
*H04N 13/04*   (2006.01)

(52) U.S. Cl.
CPC ............ *G09G 3/3696* (2013.01); *G09G 3/3291* (2013.01); *H04N 13/0404* (2013.01)

(58) Field of Classification Search
CPC .............. G09G 3/3696; G09G 3/3291; G09G 2320/0673; H04N 13/0404; G06T 19/00
See application file for complete search history.

(56) References Cited

U.S. PATENT DOCUMENTS

| | | |
|---|---|---|
| 2011/0058024 A1 | 3/2011 | Choi et al. |
| 2011/0157324 A1 | 6/2011 | Neal |
| 2011/0175943 A1 | 7/2011 | Ahn et al. |
| 2011/0216098 A1 | 9/2011 | Choi et al. |
| 2011/0267439 A1 | 11/2011 | Chen et al. |
| 2012/0032998 A1 | 2/2012 | An et al. |
| 2012/0161661 A1 | 6/2012 | Cho et al. |
| 2012/0182387 A1 | 7/2012 | Enenkl et al. |
| 2013/0106926 A1 | 5/2013 | Li et al. |
| 2013/0147861 A1 | 6/2013 | Kim et al. |
| 2013/0169693 A1 | 7/2013 | Pyo |
| 2013/0208020 A1 | 8/2013 | Jung et al. |

(Continued)

FOREIGN PATENT DOCUMENTS

| | | |
|---|---|---|
| JP | 2002-214582 | 7/2002 |
| JP | 2006-018087 | 1/2006 |
| JP | 2007-192908 | 8/2007 |

(Continued)

*Primary Examiner* — Abbas Abdulselam
(74) *Attorney, Agent, or Firm* — Innovation Counsel LLP

(57) ABSTRACT

A 3D-capable image display device includes: a display panel having a plurality of pixels and a plurality of data lines; a gamma reference voltages generator for generating a plurality of gamma reference voltages including positive gamma reference voltages and negative gamma reference voltages; a data lines driver for converting an image signal into corresponding data line drive voltages based on the plurality of gamma reference voltages; and a signal controller operating according to a mode selection signal including information for selecting one of different 3D driving methods, wherein when a gap between the positive gamma reference voltages and the negative gamma reference voltages is referred to as a black gap, and size of the black gap is variable based on the selected 3D driving method.

20 Claims, 11 Drawing Sheets

(56) References Cited

U.S. PATENT DOCUMENTS

| | | |
|---|---|---|
| 2013/0208195 A1 | 8/2013 | Cho et al. |
| 2014/0139561 A1 * | 5/2014 | Lee .............................. 345/690 |

FOREIGN PATENT DOCUMENTS

| | | |
|---|---|---|
| JP | 2008-164696 | 7/2008 |
| JP | 2011-227375 | 11/2011 |
| KR | 10-2007-0016771 A | 2/2007 |
| KR | 10-0962503 | 6/2010 |
| KR | 10-1001991 | 12/2010 |
| KR | 10-2011-0027538 | 3/2011 |
| KR | 10-2011-0107581 | 10/2011 |
| KR | 10-1182546 | 9/2012 |

* cited by examiner

FIG. 9

|  | LBRB | | LHRH | |
|---|---|---|---|---|
| Black gap | 1.5V | 2.5V | 1.5V | 2.5V |
| Luminance Increase | 6.60% | 8.30% | 11.60% | 11.20% |
| Crosstalk | 0.78% | 0.99% | 1.14% | 2.10% |

THREE-DIMENSIONAL IMAGE DISPLAY DEVICE AND DRIVING METHOD THEREOF

CROSS-REFERENCE TO RELATED APPLICATION

This application claims priority to and the benefit of Korean Patent Application No. 10-2014-0006908 filed in the Korean Intellectual Property Office on Jan. 20, 2014, the entire contents of which application are incorporated herein by reference.

BACKGROUND (a) Technical Field

The present disclosure of invention relates to a display device capable of displaying 3D images and to a driving method thereof, and in more detail, it relates to a 3D image display device including a shutter member and a driving method thereof.

(b) Description of Related Technology

A flat or otherwise thin display device such as a liquid crystal display (LCD) and an organic light emitting diodes display (OLEDD) generally includes a display panel and a driving device for electrically driving the display device.

The display panel includes a plurality of signal lines and a plurality of pixels connected thereto and arranged substantially in a matrix form. The signal lines include a plurality of gate lines configured for transferring gate signals, a plurality of data lines configured for transferring data voltages, and the like.

Each pixel may include at least one switching element connected with a corresponding gate line and with a corresponding data line, and at least one pixel electrode operatively coupled to the switching element. The pixel may additionally include an opposed electrode that electrically interacts with the pixel electrode, where the opposed electrode may be configured to receive a common voltage. The switching element may include at least one thin film transistor (TFT), and may selectively transfer to its pixel electrode a data voltage transferred by the data line which is turned on or off according to a gate signal transferred by the gate line, to the TFT. Each pixel may display an image portion having a corresponding luminance according to the data voltage applied to the pixel electrode.

The electrical driving device includes a gate lines driver configured for generating gate signals and a data lines driver configured for generating data voltages. It additionally includes a gamma reference voltages generator configured for supplying one or more gamma reference voltages to the data lines driver and it includes a signal controller configured for controlling the gate lines driver, the data driver, and the gamma reference voltages generator, and the like. The drivers may be installed on the display panel in at least one IC chip form, attached to the display panel in a TCP form, or monolithically integrated on the display panel.

The electrical driving device is configured to convert a received digital input image signal, which signal includes grayscale information into a corresponding analog image signal by using one or more reference grayscale voltages and it supplies the produced analog image signal to each pixel, thereby displaying the image. The reference grayscale voltage(s) may vary according to provided gamma data where the latter provides information on a desired gray level and on a slope of luminance of the image created as the voltage selected for the data line driving data voltage changes in response to gray voltages represented by the input image signal.

The reference grayscale voltages include a set of positive gray voltages and a set of negative gray voltages where the positive versus negative polarity is relative to a supplied or predetermined common voltage. Fine resolution grayscale voltages may be generated by interpolating as between the positive and negative gamma reference voltages where the latter are smaller in number than the fine resolution gray voltages.

A gamma reference voltages generator provided within the driving device may be configured to receive a power supply voltage or a reference voltage, and to divide the received voltage to generate from it a plurality of positive and negative gamma reference voltages.

The data driver receives the positive and negative gamma reference voltages from the gamma reference voltages generator and divides the received gamma reference voltages to generate fine resolution gray voltages for all grays that can be commanded by the received digital input image signal. The data driver selects a gray voltage corresponding to the input image signal among a plurality of gray voltages to apply the selected gray voltage as a data voltage to the data line.

A voltage gap may be provided between the common voltage and the immediately next adjacent positive and negative gamma reference voltages. This gap is referred to as a black gap. If a voltage within the black gap is applied to the display panel, a black screen is displayed.

Meanwhile, as display device technology has developed, 3D image displaying devices have come into popularity and various methods for displaying 3D images have been studied.

Generally, within the 3D image displaying technologies, one approach for creating a 3D effect relies on binocular parallax where different images are respectively displayed to the left and right eyes of the user. The binocular parallax approach is highly useful for allowing a person to perceive a stereoscopic effect at a close range for example when operating a small screen portable device (e.g., a smartphone). That is, different 2D images are respectively projected for receipt by a right eye and by a left eye, and if the image seen by the left eye (hereinafter referred to as a "left-eye image") and the image seen by the right eye (hereinafter referred to as a "right-eye image") are transmitted to the brain, the left-eye image and the right-eye image may be combined by the brain such that a 3D image allowing for depth perception is recognized.

The 3D image display devices using the binocular disparity in 3D image displays are typically categorized as stereoscopic schemes using glasses such as a shutter glasses scheme and a polarized glasses scheme, and autostereoscopic schemes in which a lenticular lens or a parallax barrier is disposed on the display device without the need for the user to wear special glasses.

In the 3D image display panel of the shutter glasses scheme, the left-eye image and the right-eye image are separated and continuously output, and the left-eye shutter and the right-eye shutter of the shutter glasses are selectively shut off by control of a shutter controller such that the 3D image is displayed.

Also in the shutter glasses scheme, as one example of a driving method when displaying the 3D image, there is an insertion of an image frame all of a predetermined gray (e.g., a black gray) between a first nonblackened frame (referred to as "a left eye image display frame") displaying a left eye image and a second nonblackened frame (referred to as "a right eye image display frame") displaying a right eye image.

In case of a method inserting the image frame of the black gray between the left eye image display frame and the right eye image display frame, crosstalk in which the left eye image and the right eye image appear to be overlapped may be reduced, however the luminance of the 3D image may be largely decreased by an influence on the human visual system of the insertion of the image frames of the black gray.

Additionally, in the shutter glasses scheme, as another example of a driving method displaying the 3D image, there is a method of maintaining the left eye image or the right eye image charged in the previous frame without application of the image creating data voltages or of repeating an applying of the data voltages for the same left eye image or right eye image as the previous frame instead of using the image frame of the black gray between the left eye image display frame and the right eye image display frame. In the case of this method, the image frame of the black gray is not inserted such that the luminance performance is improved, however crosstalk between the left eye image and the right eye image may be disadvantageously increased.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

As described above, for the several different methods of displaying the 3D image, characteristics may be remarkably changed according to driving conditions of the display device, particularly in the setting of the size and/or location of the black gap.

Accordingly, the present disclosure provides a 3D-capable image display device in which it is easy to select the black gap to appropriately correspond to the selected one of the several different methods of displaying the 3D image.

A 3D image display device according to an exemplary embodiment includes: a display panel having a plurality of pixels and a plurality of data lines; a gamma reference voltages generator generating a plurality of gamma reference voltages including a plurality of positive gamma reference voltages and a plurality of negative gamma reference voltages; a data lines driver for converting an image signal into data line drive voltage by using a plurality of gray voltages generated based on the plurality of gamma reference voltages and for applying the data line drive voltages to respective ones of the data lines; and a signal controller operating according to a mode selection signal including information for selecting a 3D driving method and controlling the gamma reference voltages generator and the data lines driver, wherein when a gap between the plurality of positive gamma reference voltages and the plurality of negative gamma reference voltages is referred to as a black gap, the black gap is a first black gap when the 3D driving method is a first driving method, and the black gap is a second black gap different from the first black gap when the 3D driving method is a second driving method different from the first driving method.

The signal controller may generate a black gap control signal to control the black gap based on the mode selection signal.

A reference voltages generator generating the plurality of reference voltages and inputting the plurality of reference voltages to the gamma reference voltages generator may be further included, and the reference voltages generator may receive the black gap control signal to control the black gap.

The reference voltages generator may include: a plurality of voltage-dividing resistors between the first power source voltage and second power source voltage; and a first resistor and a first transistor connected between both terminals of a middle resistor positioned in the middle among the plurality of voltage-dividing resistors.

The first transistor may include control terminal receiving the black gap control signal, and the first transistor may be turned on or turned off according to the black gap control signal to control a level of at a least portion among the plurality of reference voltages.

The first 3D driving method may include a LHRH driving method, the second driving method may include a LBRB driving method, and the second black gap may be larger than the first black gap.

A reference voltages generator including a plurality of voltage-dividing resistors connected between a first power source voltage and a second power source voltage and generating a plurality of reference voltages using the plurality of voltage-dividing resistors and inputting the plurality of reference voltages to the gamma reference voltages generator may be further included, and the gamma reference voltages generator may include a first resistor and a first transistor connected between both terminals of a middle resistor positioned in the middle among the plurality of voltage-dividing resistors.

The first transistor may include a control terminal receiving the black gap control signal, and the first transistor may be turned on or turned off according to the black gap control signal to control a level of at least a portion among the plurality of gamma reference voltages.

A reference voltages generator generating a plurality of reference voltages and inputting the plurality of reference voltages to the gamma reference voltages generator may be further included, and the gamma reference voltages generator may include an upper memory storing positive gamma data and a lower memory storing negative gamma data, and a first digital-to-analog convertor (DAC) for converting the positive gamma data into corresponding analog voltages and a second digital-to-analog convertor for converting the negative gamma data into corresponding analog voltages, wherein the upper memory and the lower memory each may include a first memory bank and a second memory bank, the first memory bank may store first gamma data, and the second memory bank may store second gamma data different from the first gamma data.

One of the first memory bank and the second memory bank may be selected according to the black gap control signal, and the selected one of the first gamma data or the second gamma data is input to the first and second convertors.

The black gap of the plurality of gamma reference voltages generated according to the first gamma data may be different from the black gap of the plurality of gamma reference voltages generated according to the second gamma data.

A driving method of a 3D-capable image display device including a display panel including a plurality of pixels and a plurality of data lines, a gamma reference voltages generator, and a data lines driver connected to the data lines, and a signal controller includes: receiving a mode selection signal including information for a selected one of different 3D driving methods and generating a black gap control signal based on the mode selection signal by a signal controller; generating a plurality of gamma reference voltages including a plurality of positive gamma reference voltages and a plurality of negative gamma reference voltages by the gamma reference voltages generator; and converting an image signal into corresponding data line drive voltages by using a plurality of gray voltages generated based on the plurality of gamma reference voltages by the data lines driver, wherein when a gap between a plurality of positive gamma reference voltages and a plurality of negative gamma reference voltages is referred to as a black gap, the black gap is a first black gap when the 3D driving method is a first driving method, and the black gap is a second black gap different from the first black gap when the 3D driving method is a second driving method different from the first driving method.

The 3D-capable image display device may include a reference voltages generator a including a plurality of voltage-dividing resistors connected between a first power source voltage and a second power source voltage and generating a plurality of reference voltages by using the plurality of voltage-dividing resistors and inputting the plurality of reference voltages to the gamma reference voltages generator, and the reference voltages generator may further include a first resistor and a first transistor connected between both terminals of a middle resistor positioned in the middle among the plurality of voltage-dividing resistors.

The method may further include controlling the black gap by turning on or turning off the first transistor according to the black gap control signal.

The 3D image display device may include a reference voltages generator a including a plurality of voltage-dividing resistors connected between a first power source voltage and a second power source voltage and generating a plurality of reference voltages by using the plurality of voltage-dividing resistors and inputting the plurality of reference voltages to the gamma reference voltage generator, and the gamma reference voltages generator may include a first resistor and a first transistor connected between both terminals of a middle resistor positioned in the middle among the plurality of voltage-dividing resistors.

The method may further include turning on or turning off the first transistor according to the black gap control signal to control the black gap.

The generating of the plurality of gamma reference voltages may include storing first gamma data into a first memory bank respectively included in an upper memory and a lower memory, the upper memory and the lower memory being included in the gamma reference voltages generator, storing second gamma data different from the first gamma data into a second memory bank respectively included in the upper memory and the lower memory, selecting one of the first memory bank and the second memory bank according to the black gap control signal, and converting the first gamma data or the second gamma data stored in the selected one of the first memory bank or the second memory bank into an analog voltage.

According to an exemplary embodiment of the present teachings, transmittance and lateral visibility of the display device may be improved, and display quality of the display device may be increased.

BRIEF DESCRIPTION OF THE DRAWINGS

FIG. 9 is a comparison table showing the different black gap values that means selected and display characteristics according to the corresponding 3D driving method.

DETAILED DESCRIPTION

Figure 1:
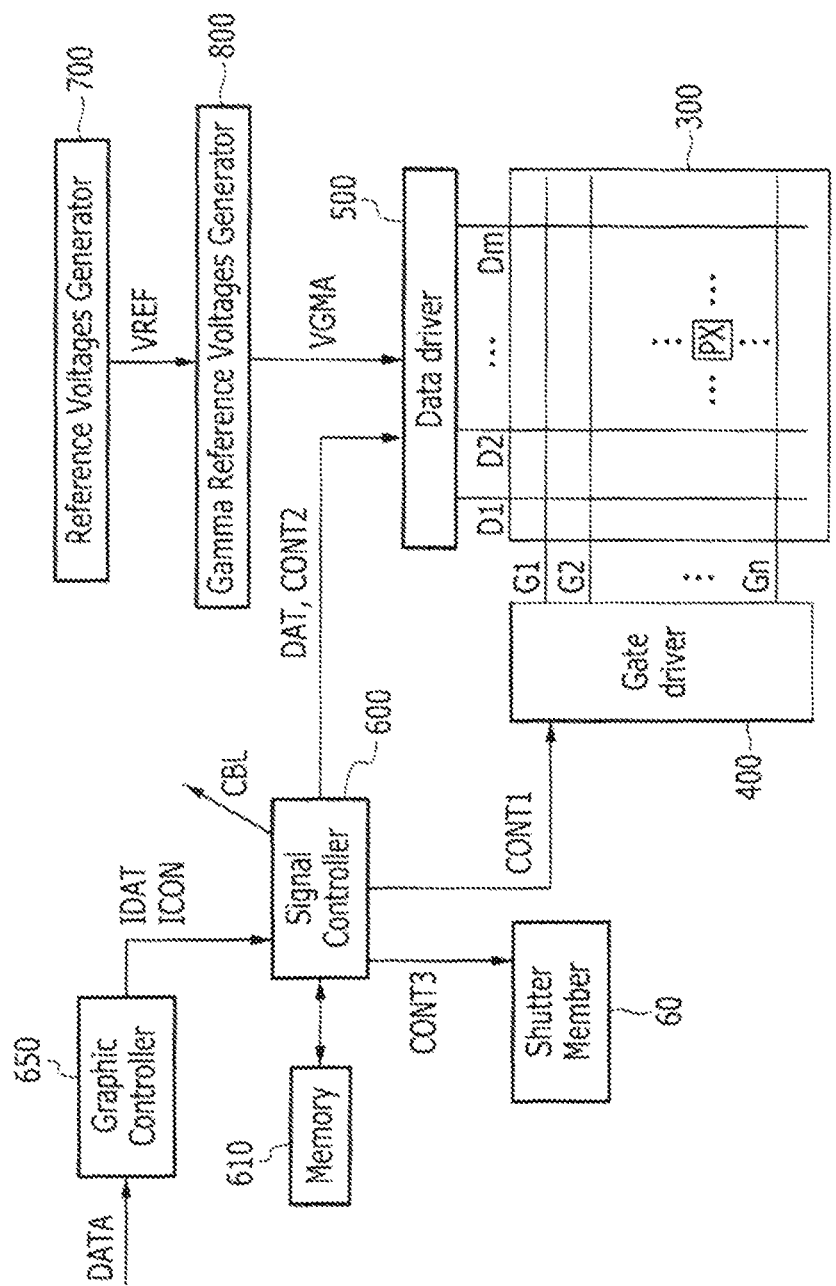
FIG. 1 is a block diagram of an exemplary 3D-capable image display device which has a variable "black gap" function in accordance with the present disclosure of invention.

The present disclosure of invention will be provided more fully hereinafter with reference to the accompanying drawings, in which exemplary embodiments of are shown. As those skilled in the art would realize in light of the disclosure, the described embodiments may be modified in various different ways, all without departing from the spirit or scope of the present teachings.

The drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

Now, a 3D-capable image display device and a driving method thereof according to an exemplary embodiment will be described with reference to accompanying drawings.

Firstly, a 3D-capable image display device and an operation thereof according to an exemplary embodiment will be described with reference to FIG. 1.

FIG. 1 is a block diagram of a 3D-capable image display device according to an exemplary embodiment.

Referring to FIG. 1, a 3D-capable image display device according to an exemplary embodiment of the present disclosure of invention includes a graphic controller 650, a display panel 300, a gate lines driver 400 and a data lines driver 500 connected to the display panel 300. Additionally, it includes a gamma reference voltages generator 800 connected to the data lines driver 500, a reference voltages generator 700 connected to the gamma reference voltages generator 800, a signal controller 600, and a shutter member 60 (e.g., spectacles).

The graphic controller 650 receives digital image information DATA, mode selection information (not shown), and the like from the outside. The mode selection signal includes information regarding whether the display mode of the image is a 2D mode or a 3D mode, and identifies a 3D driving scheme (a LBRB driving method, or a LHRH driving method, or a LLRR driving method etc.).

The graphic controller 650 generates an input control signal ICON controlling display of an input image signal IDAT, and an input image signal IDAT based on the image information DATA and the mode selection signal.

The input image signal IDAT may include luminance information, and the luminance may have a predetermined number of discrete gray levels. The input control signal ICON may include a vertical synchronization signal Vsync, a horizontal synchronizing signal Hsync, a main clock signal MCLK, a data enable signal DE, and the like regarding the image displaying. The input image signal IDAT and the input control signal ICON are transmitted to the signal controller 600.

The display panel 300 includes a plurality of signal lines and a plurality of pixels PX which are connected thereto, when viewed from an equivalent circuit perspective. In the case where the display device according to the exemplary embodiment of the present disclosure of invention is a liquid crystal display, the display panel 300 may include spaced apart lower and upper display panels (not shown) which face each other, and a liquid crystal layer (not shown) interposed between the two display panels when viewed from a cross-sectional structure.

The signal lines include a plurality of gate lines G1-Gn which transfer gate signals and extend in a row direction, and a plurality of data lines D1-Dm which transfer data voltages and extend in a column direction.

One pixel PX may include at least one switching element (e.g., TFT, not shown) which is connected to at least one of the data lines D1-Dm and at least one of the gate lines G1-Gn, and where at least one pixel electrode (not shown) is operatively coupled to thereto. The switching element may include at least one thin film transistor, and may be controlled depending on a gate signal transferred by the gate lines G1-Gn to transfer a data voltage Vd transferred by the data lines to the pixel electrode.

In order to implement color display, each pixel PX displays one of primary colors (spatial division) or alternately displays a mix of the primary colors according to time (temporal division) so that a desired color may be recognized by the human visual system due to the spatial and/or temporal sum of the primary colors.

The signal controller 600 receives the input image signal IDAT and the input control signal ICON from the graphic controller 650, and controls the operation of the gate lines driver 400, the data lines driver 500, the shutter member 60, and the gamma reference voltages generator 800.

The signal controller 600 receives an input image signal and an input control signal controlling a display thereof from an external graphic controller (not illustrated). The input image signal defines luminance information of each pixel, and the luminance has a predetermined number of discrete gray levels, for example, $1024(=2^{10})$ levels, or $256(=2^8)$, or $64(=2^6)$. Examples of the input control signal include a vertical synchronization signal Vsync and a horizontal synchronization signal Hsync, a main clock signal MCLK, a data enable signal DE, and the like. The signal controller 600 appropriately processes the input image signal based on the input image signal and the input control signal, and generates a corresponding gate control signal CONT1, a corresponding data control signal CONT2, and a stereoscopic image control signal CONT3. The data driver 500 outputs the gate control signal CONT1 to the gate lines driver 400, the data control signal CONT2 and the processed output image signal DAT to the data lines driver 500, and the stereoscopic image control signal CONT3 to the shutter member 60. The output image signal DAT as a digital signal has a discrete gray value of a predetermined number value selected from among the $2^N$ discrete gray levels that are definable by the input image signal.

The signal controller 600 may also generate a gamma data signal SDL and a clock signal SCL based on gamma data obtained from a predetermined gamma curve, and may output them to the gamma reference voltages generator 800 through an interface such as an PC (inter-integrated circuit) method. The gamma curve is a curve representing luminance or transmittance for the corresponding discrete gray scale level of the input image signal IDAT, and may generate the gray voltages or the gamma reference voltages based on it. The gamma data may be stored to a memory 610 such as an EPROM. The memory 610 may be positioned inside or outside the signal controller 600.

The signal controller 600 may be operated with a 2D mode configured for displaying a 2D image or a 3D mode configured for displaying a 3D image according to the mode selection signal. In the 3D mode, the output image signal DAT may include an image signal for different viewing points, for example, a left eye image signal and a right eye image signal.

The reference voltages generator 700 receives a high potential power supply voltage AVDD and a low potential power supply voltage VSS from the outside to generate at least four reference voltages VREF based thereon, and transmits the generated reference voltages VREF to the gamma reference voltages generator 800. The high potential power supply voltage AVDD may be a fixed voltage which may be generated in a power supply voltage supplier (not shown), and the low potential power source voltage VSS may be a ground voltage GND.

The reference voltages generator 700 generates a plurality of reference voltages VREF by voltage division using a plurality of resistors connected between the high potential power source voltage AVDD and the low potential power source voltage VSS.

The gamma reference voltages generator 800 receives the plurality of reference voltages VREF from the reference voltages generator 700 and generates gamma reference voltages VGMA based on the input gamma data signal SDL from the signal controller 600. The gamma reference voltages generator 800 transmits the generated gamma reference voltages VGMA to the data driver 500. The gamma reference voltages VGMA include a set of positive gamma reference voltages and a set of negative gamma reference voltages. The number of different gamma reference voltages VGMA is more than that of the reference voltages VREF.

The gamma reference voltages generator 800 may be integrally included in the data driver 500.

The data driver 500 receives and divides the gamma reference voltages VGMA from the gamma reference voltages generator 800 to generate a plurality of corresponding, analog gray voltages. Further, the data driver 500 receives the data control signal CONT2 and the output image signal DAT from the signal controller 600 and selects a gray voltage corresponding to each output image signal DAT to convert the output image signal DAT into a data voltage which is an analog data signal. The data control signal CONT2 includes a horizontal synchronization start signal notifying of transmission start of the output image signal DAT for a pixel PX in one row and a load signal instructing that the data voltage is applied to the data lines D1-Dm. The data control signal CONT2 may further include a polarity inversion signal calling for inverting or noninverting of an electrical polarity of the data voltage relative to a common voltage Vcom (referred to as a polarity of the data voltage). The data lines driver 500 is connected to the data lines D1-Dm of the display panel 300 to apply the respective analog data voltages to the corresponding data lines D1-Dm.

In the 3D image display mode, the produced data voltage signals may include a right eye image data voltages signal (referred to as "a right eye data voltage") corresponding to the right eye image and a left eye image data voltages signal (referred to as "a left eye data voltage").

The gate lines driver 400 receives the gate control signal CONT1 from the signal controller 600 to generate respective gate signals each constituted as a combination of a gate-on voltage Von turning on the switching element of the pixel PX and a gate-off voltage Voff turning off the switching element based thereon. The gate control signal CONT1 may include a scanning start signal STV instructing a scanning start. The gate lines driver 400 is connected with the gate lines G1-Gn of the display panel 300 to apply the gate signal to the gate lines G1-Gn.

When the gate lines driver 400 sequentially applies gate-on pulses constituted by the gate-on voltages to the gate lines G1-Gn to turn on the switching elements connected to the gate lines G1-Gn, the data voltage applied to the data lines D1-Dm is applied in synchronism to the corresponding pixels PX through the turned-on switching elements. When the respective data voltage is applied to the corresponding pixel PX, the pixel PX may display luminance corresponding to the data voltage through various optical conversion elements. For example, in the case of the liquid crystal display, an inclination angle or degree of liquid crystal molecules of the liquid crystal layer is controlled to control polarization of light, thereby displaying luminance corresponding to the gray of the input image signal IDAT.

By repeating the process by setting a 1 horizontal period 1H as a unit, the gate-on voltages Von are sequentially applied to all of the gate lines G1-Gn and the data voltages are applied to all of the pixels PX to display images of one frame.

The shutter member 60 to realize the stereoscopic image display is switched open in coincidence with projecting an image for the left eye (referred to as "a left eye image") through the left eye shutter to the left eye and an image for the right eye (referred to as "a right eye image") through the right eye shutter to the right eye, thereby generating a binocular disparity. That is, the shutter member 60 inputs images viewed at different angles with both eyes and thus an observer may perceive a 3D effect. The shutter member 60 may be operated according to the stereoscopic image control signal CONT3 provided from the signal controller 600. The stereoscopic image control signal CONT3 may include a synchronization signal controlling operation timing of the shutter member 60.

Next, a driving method of the 3D image display device will be described with reference to FIG. 2 and FIG. 3 along with FIG. 1.

Figure 2:
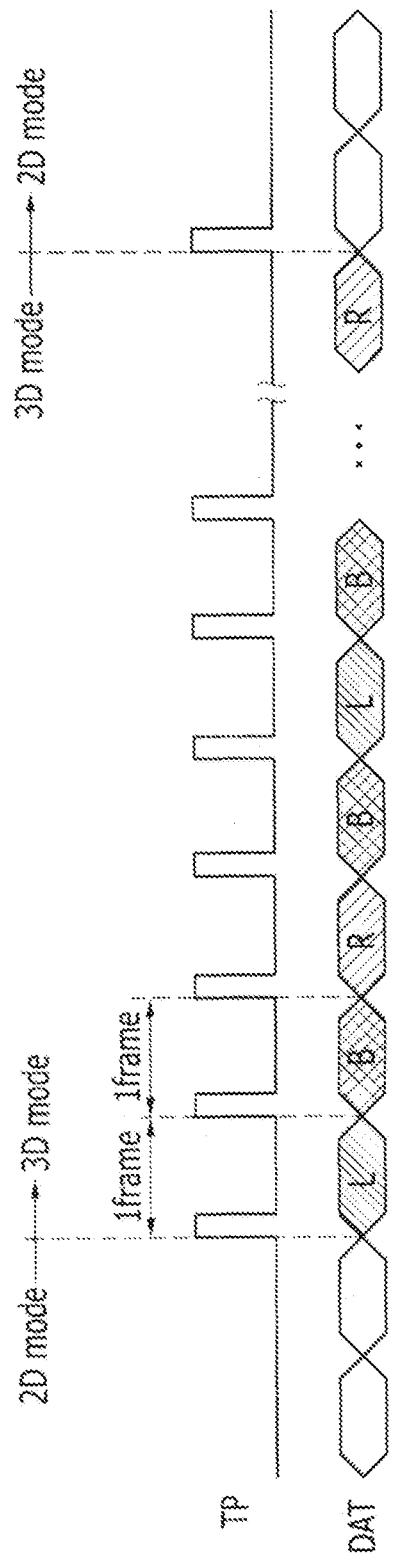
FIG. 2 is a first timing diagram showing an output order of output image signals supplied to the data lines driver of the 3D image display device of FIG. 1 when a first 3D creation mode is selected.

FIG. 2 is a timing diagram showing an output order of an output image signal input to a data lines driver of a 3D image display device according to an exemplary embodiment. FIG. 3 is a view showing an image displayed during a plurality of frames by a 3D image display device according to the exemplary embodiment when a respective 3D driving method is used as shown in FIG. 2.

Firstly, the signal controller 600 receives the input image signal IDAT and the input control signal ICON from the outside and then processes the input image signal IDAT to generate the output image signal DAT. In the case of the 3D mode, the output image signal DAT may include the image signal for the different viewing points, for example, the left eye image signal L and the right eye image signal R, and alternatively may output the left eye image signal L and the right eye image signal R.

The data driver 500 receives output image signals DAT for pixels PX in one row according to the data control signal CONT2 from the signal controller 600, and selects a gray voltage corresponding to each output image signal DAT to convert the output image signal DAT into a data voltage Vd which is an analog data signal and then apply the converted data voltage Vd to the corresponding data lines D1-Dm. The data driver 500 applies the data voltage Vd corresponding to the output image signal DAT to the data lines D1-Dm in synchronization with the data load signal TP.

The gate lines driver 400 applies the gate-on voltage Von to the gate lines G1-Gn according to the gate control signal CONT1 from the signal controller 600 to turn on the switching elements Q connected with the gate lines G1-Gn. Then, the data signal which had been applied to the data lines D1-Dm is applied to the corresponding pixels PX through the turned-on switching elements.

As such, when the gate-on voltages Von are applied to the gate lines G1-Gn, the switching elements connected to the gate lines G1-Gn are turned on, and the data voltages Vd then applied to the data lines D1-Dm are applied to the corresponding pixels PX through the turned-on switching elements.

A difference between a data voltage applied to the pixel PX and a common voltage Vcom is represented as a pixel voltage. In the case of a liquid crystal display, the pixel voltage is a charging voltage of a liquid crystal capacitor, and an arrangement of liquid crystal molecules varies according to a magnitude of the pixel voltage, and as a result, polarization of light passing through a liquid crystal layer is changed. A change in the polarization is converted into a change in transmittance of light by use of a polarizer attached to the liquid crystal display.

The gate-on voltage Von is applied to all gate lines G1-Gn such that the data voltage Vd is applied to all pixels PX, and if necessary, if a light source such as a backlight (not shown) irradiates light to the display panel 300, the image of one frame may be displayed. The observer may divide and observe the left eye image and the right eye image by using the shutter member 60.

After one frame ends, the next frame starts. Then, a state of an inverse signal, which is applied to the data driver 500, is controlled to make the polarity of the data voltage Vd applied to each pixel PX opposite to the polarity of the previous frame. Even in one frame, polarities of the data voltages Vd flowing through one of the data lines D1-Dm may be periodically changed according to a characteristic of the inversion signal, or polarities of the data voltages Vd applied to the data lines D1-Dm in one pixel row may be different from each other.

Referring to FIG. 2, in the 3D mode, a blackened image signal (referred to as "a black image signal B") of a predetermined gray (e.g., a black gray) may be inserted between an input period of a left eye image signal L of one frame and the input period of the right eye image signal R of one frame, for example, during one frame. That is, the black image display frame corresponding to the black image signal B may be inserted between the left eye image display frame and the right eye image display frame. A length of the black image display frame may be about one frame, but is not limited thereto. A driving method of this 3D image display device is referred to herein as the "LBRB driving method".

In the case of the LBRB driving method, crosstalk in which the left eye image and the right eye image appear to be overlapped may be reduced, however the luminance of the 3D image such as the left eye image or the right eye image may be decreased by the influence of the black image display frame on the human visual system.

Figure 3:
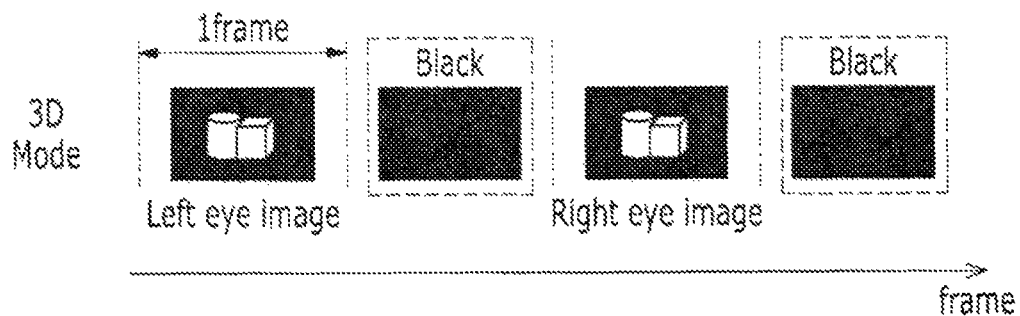
FIG. 3 is a view showing an image displayed during a plurality of frames by a 3D image display device when driven according to the first 3D driving method shown in FIG. 2.

Referring to FIG. 2 and FIG. 3, the left eye shutter and the right eye shutter of the shutter member 60 are alternately shut off in synchronization with the timing with which the left eye image and the right eye image are displayed, thereby recognizing the 3D image. The shutoff timing of the left eye shutter and the right eye shutter of the shutter member 60 may be appropriately controlled by considering a time that the pixel PX takes to reach a target light transmittance after the right eye data voltage or the left eye data voltage are applied, that is, a response speed of the pixel PX and ON timing of the backlight.

Next, a driving method of the 3D image display device according to another (second 3D mode) will be described with reference to FIG. 4 and FIG. 5 along with FIG. 1.

Figure 4:
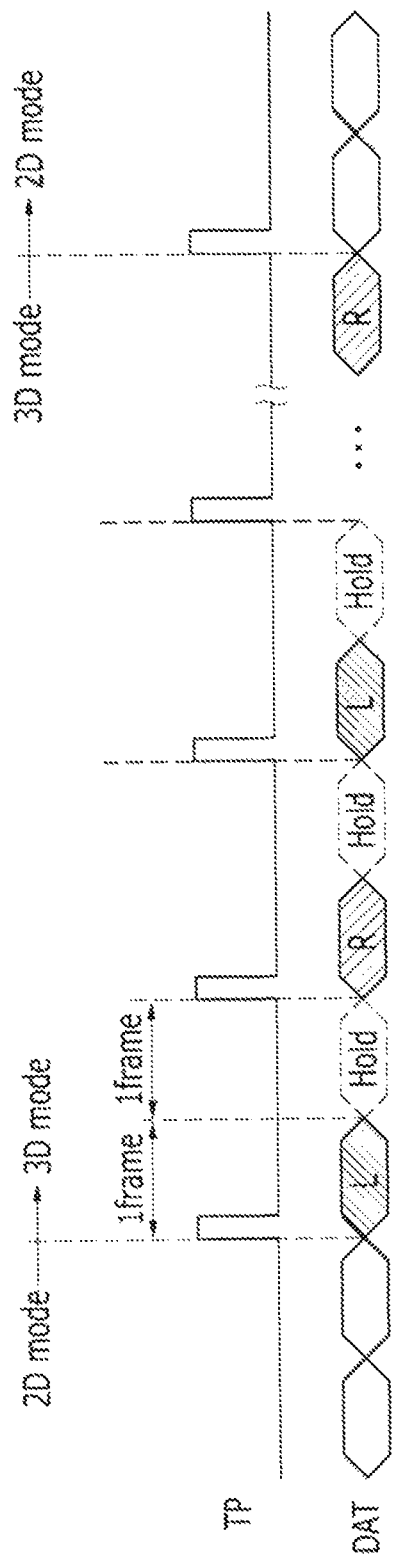
FIG. 4 is a second timing diagram showing an output order of output image signals supplied to the data lines driver of the 3D image display device of FIG. 1 when a second 3D creation mode is selected.

FIG. 4 is a timing diagram showing an output order of an output image signal input to a data driver of a 3D image display device according to the second mode. FIG. 5 is a view showing an image displayed during a plurality of frames by a 3D image display device according to an exemplary embodiment of the present disclosure of invention when operating according to the second 3D driving method shown in FIG. 4.

The driving method of the 3D image display device according to the present exemplary embodiment is substantially the same as most of the exemplary embodiment shown in FIG. 2 and FIG. 3, except that the black image display frame is not inserted, and instead the image of the previous frame is maintained between the left eye image display frame and the right eye image display frame.

In detail, referring to FIG. 4, in the second 3D mode, a hold period Hold for holding the pixel voltage charged with the data voltage Vd corresponding to the left eye image signal L or the right eye image signal R of the previous frame during a predetermined time may be positioned between the input period of the left eye image signal L of one frame and the input period of the right eye image signal R of one frame. In the hold period Hold, the data line driving voltages Vd are not output from the data lines driver 500 and the corresponding pixels PX are not charged (refreshed) with new data voltages Vd. However, the liquid crystal capacitors of the device substantially retain their earlier charged states. The hold period Hold may be maintained during the about one frame, but is not limited thereto. The driving method of the 3D image display device is referred to as "a LHRH driving method".

In the hold period Hold, the rest of the response for the target light transmittance of the pixel PX that has been performed in the previous frame may be performed again, and if the discharge of the pixel voltage or a leakage current is small, the pixel voltage charged in the previous frame may be constantly and substantially maintained as the same during most of the hold period Hold.

A sum time of the input period of the data voltage Vd for the left eye image signal L or the right eye image signal R of the previous frame and the hold period Hold directly after it may be about the same as the time between the adjacent pulses of the data load signal TP, for example, it may be about 16.7 ms.

In the case of the LHRH driving method, if the discharge of the charge voltage of the pixel PX, that is, the pixel voltage, is somehow performed during the hold period Hold, the crosstalk in which the left eye image and the right eye image appear to be overlapped may be decreased, however a generation amount of the crosstalk is larger as compared to the described LBRB driving method. However, since the black image is not intentionally inserted, the perceived luminance of the 3D image of the left eye image or the right eye image may be increased.

Figure 5:
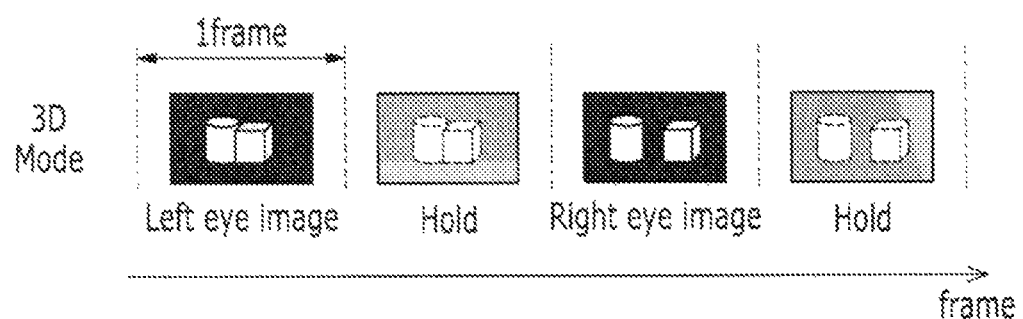
FIG. 5 is a view showing an image displayed during a plurality of frames by a 3D image display device when driven according to the second 3D driving method shown in FIG. 4.

Referring to FIG. 4 and FIG. 5, the left eye shutter and the right eye shutter of the shutter member 60 are shut off in synchronization with the timing of the left eye image display frame and the following hold period Hold, and the right eye image display frame and the following hold period Hold, thereby recognizing the 3D image. The shutoff timing of the left eye shutter and the right eye shutter of the shutter member 60 may be appropriately controlled by considering a time that the pixel PX takes to reach a target light transmittance after the right eye data voltage or the left eye data voltage are applied, that is, a response speed of the pixel PX and ON timing of the backlight.

Next, a third driving method of the 3D image display device according to an exemplary embodiment of the present disclosure of invention will be described with reference to FIG. 6 along with FIG. 1.

Figure 6:
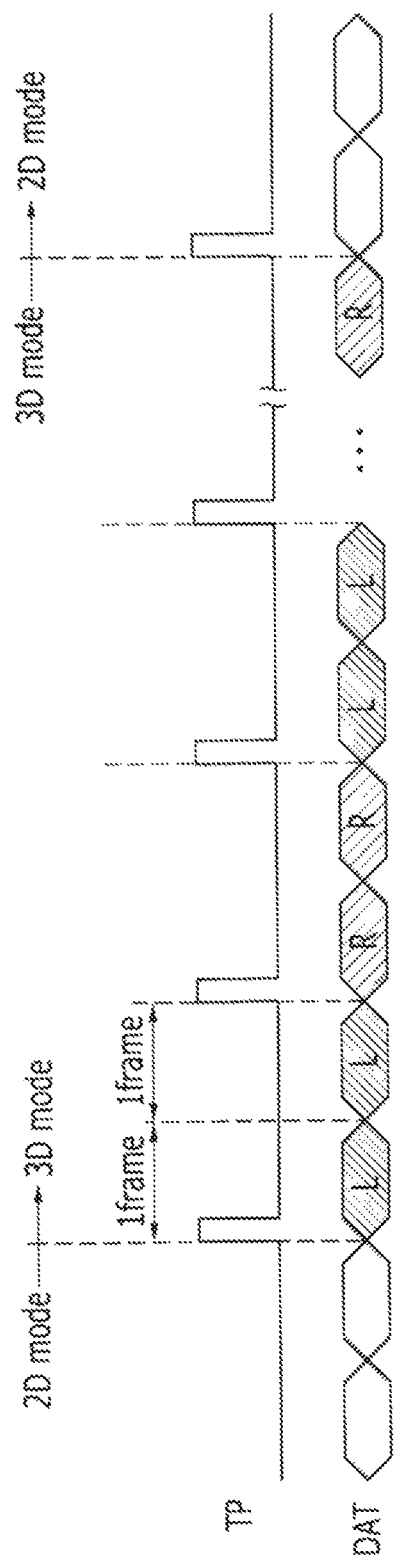
FIG. 6 is a timing diagram showing an output order of an output image signals supplied to the data lines driver of the 3D image display device of FIG. 1 when a third 3D creation mode is selected.

FIG. 6 is a timing diagram showing an output sequence of an output image signal input to a data driver of a 3D image display device according to an exemplary embodiment.

The third driving method of the 3D image display device is substantially the same as most of the exemplary embodiment shown in FIG. 4 and FIG. 5, except the left eye image or the right eye image that is displayed in the previous frame may be further displayed (refreshed, repainted) in at least one frame instead of the hold period Hold.

In detail, referring to FIG. 6, in the 3D mode, the left eye image signal L or the right eye image signal R for one input image signal IDAT may be input a plurality of times in a plurality of continuous frames. For example, as shown in FIG. 6, the same left eye image signal L may be input two times according to the pulse of the data load signal TP in two continuous frames, and the same right eye image signal R may be input two times according to the pulse of the data load signal TP in two continuous frames. A time between adjacent pulses of the data load signal TP may be about the same as one frame, and one frame may be about 8.33 ms, but is not limited thereto. For example, a driving frequency in which the frame is repeated may be about 240 Hz. The driving method of the 3D image display device is referred to as "an LLRR driving method".

In the case of the LLRR driving method, since the black image is not intentionally inserted, like the LHRH driving method, the luminance of the 3D image of the left eye image or the right eye image may be increased. However, the generation amount of the crosstalk between the left eye image and the right eye image is larger when compared with the LBRB driving method.

The left eye shutter and the right eye shutter of the shutter member 60 are alternately shut off in synchronization with a plurality of continuous left eye image display frames or a plurality of continuous right eye image display frames, thereby recognizing the 3D image. The shutoff timing of the left eye shutter and the right eye shutter of the shutter member 60 may be appropriately controlled by considering a time that the pixel PX takes to reach a target light transmittance after the right eye data voltage or the left eye data voltage are applied, that is, a response speed of the pixel PX and ON timing of the backlight.

As described above, the driving method of the 3D image display device to display the 3D image, in other words, the 3D driving method, may have different various modes such as the LBRB driving method, the LHRH driving method, or the LLRR driving method. However the modes are not the same because the 3D display characteristics such as the perceived luminance of the 3D image and the perceived crosstalk between the left eye image and the right eye image have differences according to the 3D driving method. The 3D driving methods may be classified according to the kinds of image displayed in the next frame or a method of displaying the image after displaying the image of one viewing point, for example, the left eye image or the right eye image during one frame.

Next, a variable black gap driving method of the 3D image display device according to an exemplary embodiment of the present disclosure of invention will be described with reference to FIG. 7 along with FIG. 1.

Figure 7:
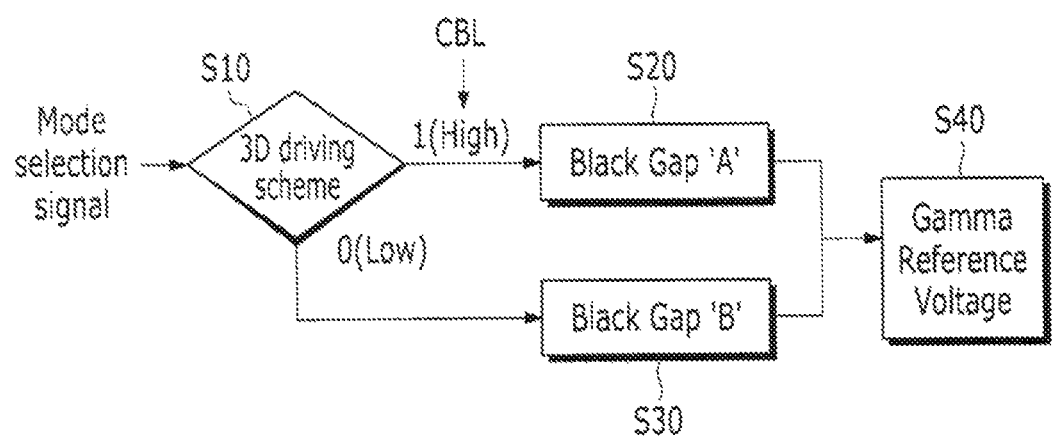
FIG. 7 is a flow chart showing a machine-implemented method of selecting an appropriate one of plural black gaps depending on which 3D driving method is selected for current use by the 3D image display device.

FIG. 7 is flowchart depicting a method of selecting one of plural and different black gaps in accordance with a detected or specified 3D driving method.

Firstly, as described above, the reference voltages generator 700, for example, generates at least four reference voltages VREF having different magnitudes. Among the reference voltages VREF, higher positive ones of the reference voltages with reference to the common voltage Vcom are referred to as the upper reference voltages, and lower or most negative ones of the reference voltages with respect to the common voltage Vcom are referred to as the lower reference voltages. These reference voltages VREF are transmitted to the gamma reference voltages generator 800 to generate a plurality of gamma reference voltages VGMA including the positive gamma reference voltages and the negative gamma reference voltages through a voltage division scheme such as one using a plurality of resistors.

At this time, the positive gamma reference voltages may have a highest upper reference voltage, a lowest upper reference voltage, and at least one level therebetween among the upper reference voltages, and the negative gamma reference voltages may have a most negative lower reference voltage, a least negative lower reference voltage, and a level therebetween among the lower reference voltages. Accordingly, a plurality of gamma reference voltages VGMA may not have a voltage level between the lowest upper reference voltage and the least negative lower reference voltage. That is, the lowest gamma reference voltage among the positive gamma reference voltages may not be the same as the least negative gamma reference voltage among the negative gamma reference voltage such that a gap therebetween is provided.

Alternatively, the lowest gamma reference voltage among the positive gamma reference voltage may be predetermined to be higher or lower than the lowest upper reference voltage, and the highest gamma reference voltage among the negative gamma reference voltage may be predetermined to be higher or lower than the highest lower reference voltage.

A region between the plurality of positive gamma reference voltages and the plurality of negative gamma reference voltages, in detail, a region between the lowest gamma reference voltage among the positive gamma reference voltage and the highest (least negative) gamma reference voltage among the negative gamma reference voltage, is referred to herein as "a black gap". That is, a gap between the positive gamma reference voltages and the negative gamma reference voltages is created adjacent to the level of the common voltage Vcom. If a voltage within the black gap region is applied to one or more pixels of the display panel 300, a corresponding black image is displayed at the respective pixels.

Referring to FIG. 7, firstly, the signal controller 600 of the 3D image display device according to an exemplary embodiment of the present invention receives and/or stores a mode selection signal which selects the 3D driving method. Then based on the received and/or stored mode selection signal, the signal controller 600 outputs a corresponding black gap control signal CBL (step S10).

For example, when the signal controller 600 selects the 3D driving method in which the black image display frame is not inserted between the left eye image display frame and the right eye image display frame, for example, in the LHRH driving method, or in the LLRR driving method, or in an alternate 3D driving method having substantially the same 3D display characteristic, the black gap control signal CBL having a high level (High, '1') is output by the signal controller 600.

(Alternatively, a reverse logic may be used wherein, when the signal controller 600 selects the LHRH driving method, or the LLRR driving method, or the driving method having substantially the same 3D display characteristic, the black gap control signal CBL having the level of the low level (Low, 0) may be output.)

In response to receipt of the black gap control signal CBL having the high level ('1'), the reference voltages generator 700 generates a plurality of positive and negative reference voltages VREF for which the magnitude of the black gap is a predetermined first black gap value 'A' (S20). On the other hand, in response to receipt of the black gap control signal CBL having the low level ('0'), the reference voltages generator 700 generates a plurality of positive and negative reference voltages VREF for which the magnitude of the black gap is a different and second black gap value 'B' (S30). The second black gap 'B' may be larger than the first black gap 'A'.

Next, the gamma reference voltages generator 800 or the data driver 500 generates a corresponding plurality of gamma reference voltages VGMA based on the reference voltages VREF (including the interposed first or second black gap) received from the reference voltages generator 700 (S40). The operation of the display device is thereby affected by whether the CBL signal is a '1' or a '0'.

Next, a structure of the reference voltages generator 700 and the gamma reference voltages generator 800 of the 3D image display device according to an exemplary embodiment of the present disclosure will be described with reference to FIG. 8 along with FIG. 1.

Figure 8:
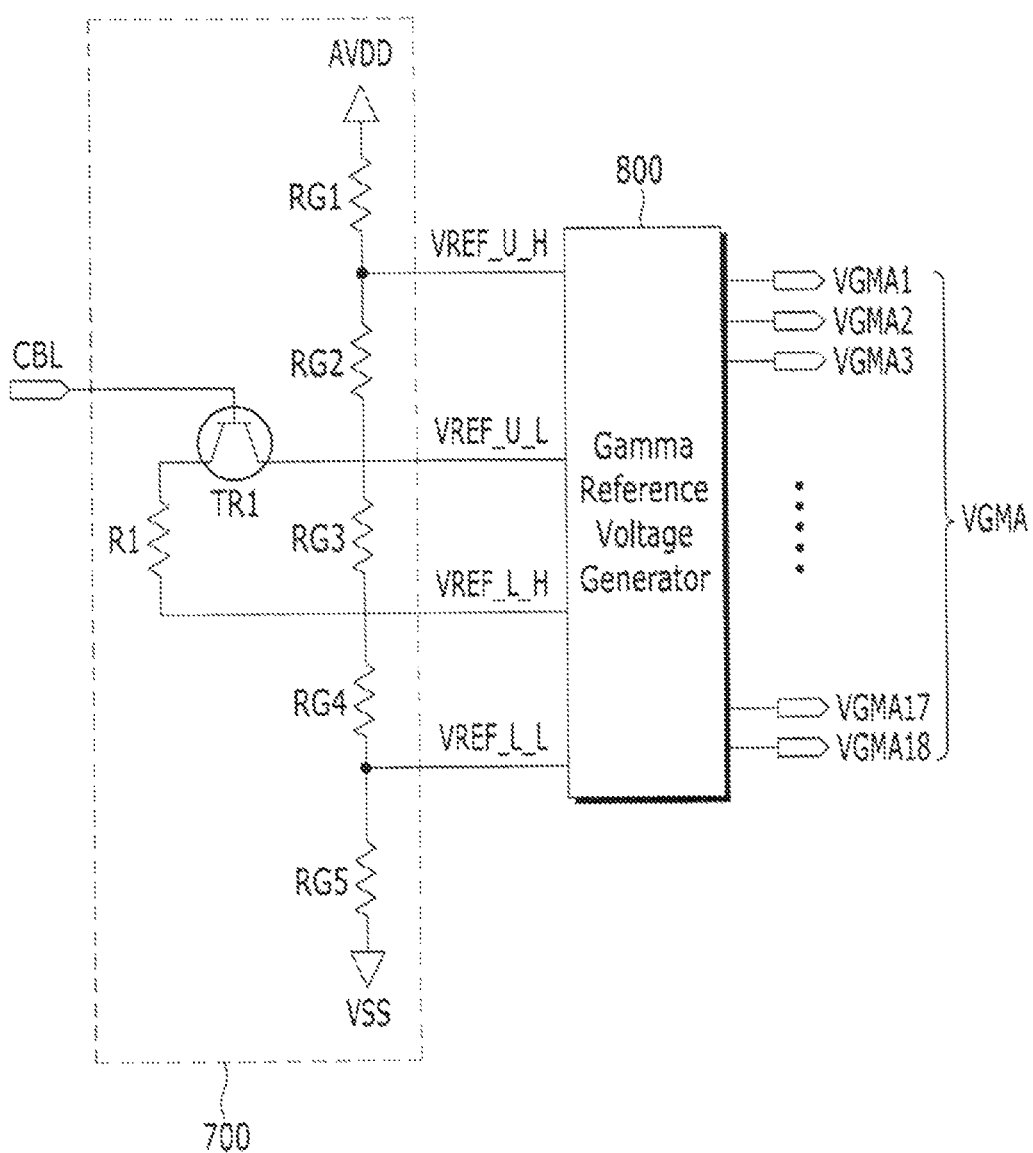
FIG. 8 is a first circuit diagram showing a reference voltages generator and a gamma reference voltages generator of a first 3D image display device in accordance with the present disclosure of invention.

FIG. 8 is a circuit diagram of a reference voltages generator 700 and a gamma reference voltages generator 800 in accordance with a first exemplary embodiment.

Referring to FIG. 8, the reference voltages generator 700 of the 3D image display device includes a resistor column including a plurality of resistors RG1-RG5 coupled in series between the high potential power source voltage AVDD and the low potential power source voltage VSS. It further includes a first transistor TR1 and a first resistor R1 coupled in series to one another where the latter series pair is coupled in parallel with a middle resistor RG3 among the plurality of resistors RG1-RG5.

The first transistor TR1 and the first resistor R1 are coupled to each other in series between both terminals of the middle resistor RG3. The black gap control signal CBL is input to the control terminal of the first transistor TR1.

The reference voltage generator 700 divides the voltage spread between the high potential power source voltage AVDD and the low potential power source voltage VSS into a plurality of discrete intermediate levels by using resistors RG1-RG5 of the resistor column to generate at least two upper reference voltages VREF_U_H and VREF_U_L and at least two lower reference voltages VREF_L_H and VREF_L_L. The upper reference voltages VREF_U_H and VREF_U_L may be higher than the common voltage Vcom, and the lower reference voltages VREF_L_H and VREF_L_L may be lower than the common voltage Vcom (and thus considered to be of a negative polarity).

When the lowest upper reference voltage VREF_U_L is the same as the lowest gamma reference voltage among the positive gamma reference voltages and the highest lower reference voltage VREF_L_H is the same as the highest gamma reference voltage among the negative gamma reference voltages, the region between the highest lower reference voltage VREF_L_H and the highest lower reference voltage VREF_L_H corresponds to the black gap that is described above. The black gap may be predetermined to be less than a threshold voltage Vth of a liquid crystal molecule needed to maintain a non-default contrast ratio in the case of the liquid crystal display of a VA mode. The lowest upper reference voltage VREF_U_L and the highest lower reference voltage VREF_L_H among the voltage of the black gap may be a positive black data voltage and negative black data voltage to display the black image, respectively.

The upper reference voltages VREF_U_H and VREF_U_L and the lower reference voltages VREF_L_H and VREF_L_L together form a plurality of reference voltages VREF. The magnitude and the sequence of the upper and lower reference voltages VREF_U_H, VREF_U_L, VREF_L_H, and VREF_L_L are determined according to the magnitude of the resistors RG1-RG5. The magnitude of the resistors RG1-RG5 may be controlled according to design conditions.

According to the present exemplary embodiment, when the black gap control signal CBL is the high level, the first transistor TR1 is turned on such that the first resistor R1 is operatively coupled to be effectively in parallel with the middle resistor RG3. Thus, the resistance between both terminals of the middle resistor RG3 is smaller than the resistance of the middle resistor RG3 taken alone such that a voltage difference between the lowest upper reference voltage VREF_U_L and the highest lower reference voltage VREF_L_H, that is, the magnitude of the black gap, becomes the smaller first black gap 'A'.

In contrast, when the black gap control signal CBL is the low level, the first transistor TR1 is turned off such that the current does not flow to the first resistor R1. Thus, the resistance between both terminals of the middle resistor RG3 is substantially the same as the resistance of the middle resistor RG3 taken alone such that the voltage difference between the lowest upper reference voltage VREF_U_L and the highest lower reference voltage VREF_L_H, that is, the magnitude of the black gap, becomes the larger second black gap 'B' different from the first black gap 'A'.

Depending on whether the black gap control signal CBL is the high level ('1') or the low level ('0'), the resistance between both terminals of the middle resistor RG3 becomes different such that the upper and lower reference voltages VREF_U_H, VREF_U_L, VREF_L_H, and VREF_L_L may be different.

The upper and lower reference voltages VREF_U_H, VREF_U_L, VREF_L_H, and VREF_L_L that are generated as above are input to the gamma references voltage generator 800 or the data driver 500.

The number of resistors RG1-RG5 included in the reference voltages generator 700 is not limited to that illustrated and may be changed according to a number of design conditions or a desired plurality of reference voltages VREF.

The gamma reference voltages generator 800 generates a plurality of gamma reference voltages VGMA based on the upper and lower reference voltages VREF_U_H, VREF_U_L, VREF_L_H, and VREF_L_L input from the reference voltages generator 700 and the gamma data signal SDL input from the signal controller 600. The gamma reference voltages VGMA include positive gamma reference voltages VGMA1-VGMA9 that are larger than the common voltage Vcom, in detail, are the same as or larger than the lowest upper reference voltage VREF_U_L, and the negative gamma reference voltages VGMA10-VGMA18 that are smaller than (lower than) the common voltage Vcom, in detail, are the same as or smaller than the highest lower reference voltage VREF_L_H.

The number of the gamma reference voltages VGMA may be 18, but is not limited thereto. Also, the magnitude of the gamma reference voltage VGMA may be appropriately controlled to be optimized according to the conditions of the display panel 300.

As described above, according to an exemplary embodiment of the present disclosure of invention, the black gap is a variable whose value may be differently controlled through use of the black gap control signal CBL of the 3D driving method. Accordingly, the appropriate black gap may be selected according to the detected or specified 3D driving method.

FIG. 9 is an exemplary table of two different black gap values and of display characteristics that occur under both but are also depicted according to the 3D driving method being used in the 3D image display device of the present disclosure of invention, Referring to FIG. 9, in the case of the LBRB driving method being used, when the black gap is large, the luminance of the 3D image is increased and the crosstalk is also increased. For example, when the black gap is 1.5 V, the luminance is increased by 6.6% compared with a reference. However, if the black gap is increased to 2.5 V for the LBRB driving method, the luminance is increased by 8.3% compared with the reference. At the same time, when the black gap is 1.5 V, the crosstalk increase degree is 0.78% compared with a reference, and then if the black gap is increased to 2.5 V, the crosstalk increase degree is 0.99% compared with the reference. So a bigger black gap (e.g., 2.5V) provides a significant increase in luminance (e.g., +8.30% as compared to +6.60%).

In contrast, in the case of the LHRH driving method, when the black gap becomes larger, the crosstalk is increased, however the luminance of the 3D image is hardly (not significantly) changed. For example, when the black gap is 1.5 V, the luminance is +11.6% compared with the reference, and if the black gap is increased to 2.5 V, the luminance maintains a similar value of an +11.2% increase compared with the reference, while when the black gap is 1.5 V, the crosstalk increase degree is 1.14%, and when the black gap is increased to 2.5 V, the crosstalk degree is significantly increased to 2.1%. In the case of the LLRR driving method, 3D image display characteristics that are similar to the case of the LHRH driving method appear.

In other words, in the case of the LBRB driving method, the crosstalk degree is very low compared with the other driving methods such that the luminance of the 3D image as a weakness may be remarkably improved by increasing the black gap, thereby improving the entire display characteristic. In contrast, in the case of the LHRH driving method or the LLRR driving method, compared with the LBRB driving method, the luminance of the 3D image is very high such that the crosstalk as the weakness is remarkably improved by using the smaller black gap value ('A'), thereby improving the entire display characteristic. As described above, the difference of the 3D image display characteristic of the 3D driving method is large according to the black gap such that it is necessary to differentiate the black gap according to the 3D driving method.

According to an exemplary embodiment of the present disclosure, the black gap may be optimally selected according to the 3D driving method without a change of hardware such that the 3D display characteristic may be uniformly improved for all of the different 3D driving methods. Accordingly, product development and product efficiency may be increased by unifying development specifications of the 3D image display device and a freedom degree for freely selecting the 3D driving method may be obtained, thereby reinforcing product competitiveness.

Next, a structure of the reference voltages generator 700 and the gamma reference voltages generator 800 of the 3D image display device according to another exemplary embodiment will be described with reference to FIG. 10 along with the described drawings.

Figure 10:
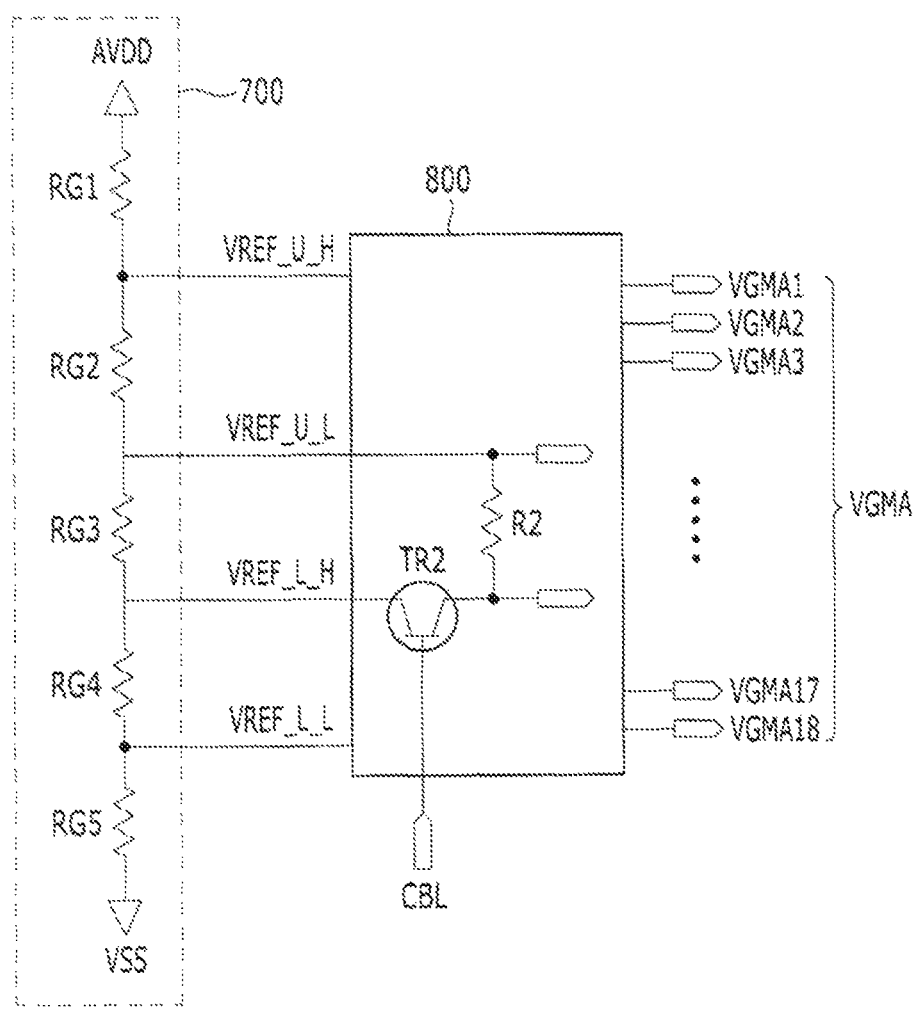
FIG. 10 and FIG. 11 are circuit diagrams of other reference voltages generators and gamma reference voltages generators that may be used in a 3D image display device according to the present disclosure of invention, respectively.

FIG. 10 is a circuit diagram of a reference voltages generator 700 and a gamma reference voltages generator 800 of a 3D image display device according to the other exemplary embodiment.

Referring to FIG. 10, the structure of the reference voltages generator 700 and the gamma reference voltages generator 800 of the 3D image display device according to an exemplary embodiment is basically the same as most of the exemplary embodiment shown in FIG. 8, however the first transistor TR1 and the first resistor R1 are omitted from within the reference voltages generator 700 and instead the gamma reference voltages generator 800 may include a second transistor TR2 and a second resistor R2 coupled so as to be selectively parallel or not with the middle resistor RG3.

The second transistor TR2 and the second resistor R2 are coupled in series between both terminals of the middle resistor RG3. The black gap control signal CBL is input to the control terminal of the second transistor TR2.

According to the present exemplary embodiment, when the black gap control signal CBL is the high level, the second transistor TR2 is turned on such that the second resistor R2 is coupled in parallel to the middle resistor RG3 of the reference voltage generator 700. Thus, the resistance between both terminals of the middle resistor RG3 is smaller than the resistance of the middle resistor RG3 such that the voltage difference between the lowest upper reference voltage VREF_U_L and the highest lower reference voltage VREF_L_H, that is, the black gap, becomes the first black gap 'A'. In this case, the lowest upper reference voltage VREF_U_L may be the same as the lowest gamma reference voltage among the positive gamma reference voltage, and the highest lower reference voltage VREF_L_H may be the same as the highest gamma reference voltage among the negative gamma reference voltage.

In contrast, when black gap control signal CBL is the low level, the second transistor TR2 is turned off such that the current does not flow to the second resistor R2. Thus, the resistance between both terminals of the middle resistor RG3 is substantially the same as the resistance of the middle resistor RG3 such that the voltage difference between the lowest upper reference voltage VREF_U_L and the highest lower reference voltage VREF_L_H, that is, the black gap, becomes the second black gap 'B' different from the first black gap 'A'. The second black gap 'B' may be larger than the first black gap 'A'.

When the black gap control signal CBL is the high level and the low level, the resistance between both terminals of the middle resistor RG3 is different such that the upper and lower reference voltages VREF_U_H, VREF_U_L, VREF_L_H, and VREF_L_L may be differentiate.

The upper and lower reference voltages VREF_U_H, VREF_U_L, VREF_L_H, and VREF_L_L that are generated as described above are input to the gamma reference voltages generator 800 or the data lines driver 500.

The rest of the characteristics and effects according thereto of the exemplary embodiment shown in FIG. 10 are the same as in the description of the exemplary embodiment shown in FIG. 8.

Next, a structure of the reference voltages generator 700 and the gamma reference voltages generator 800 of the 3D image display device according to an exemplary embodiment will be described with reference to FIG. 11 along with the described drawings.

Figure 11:
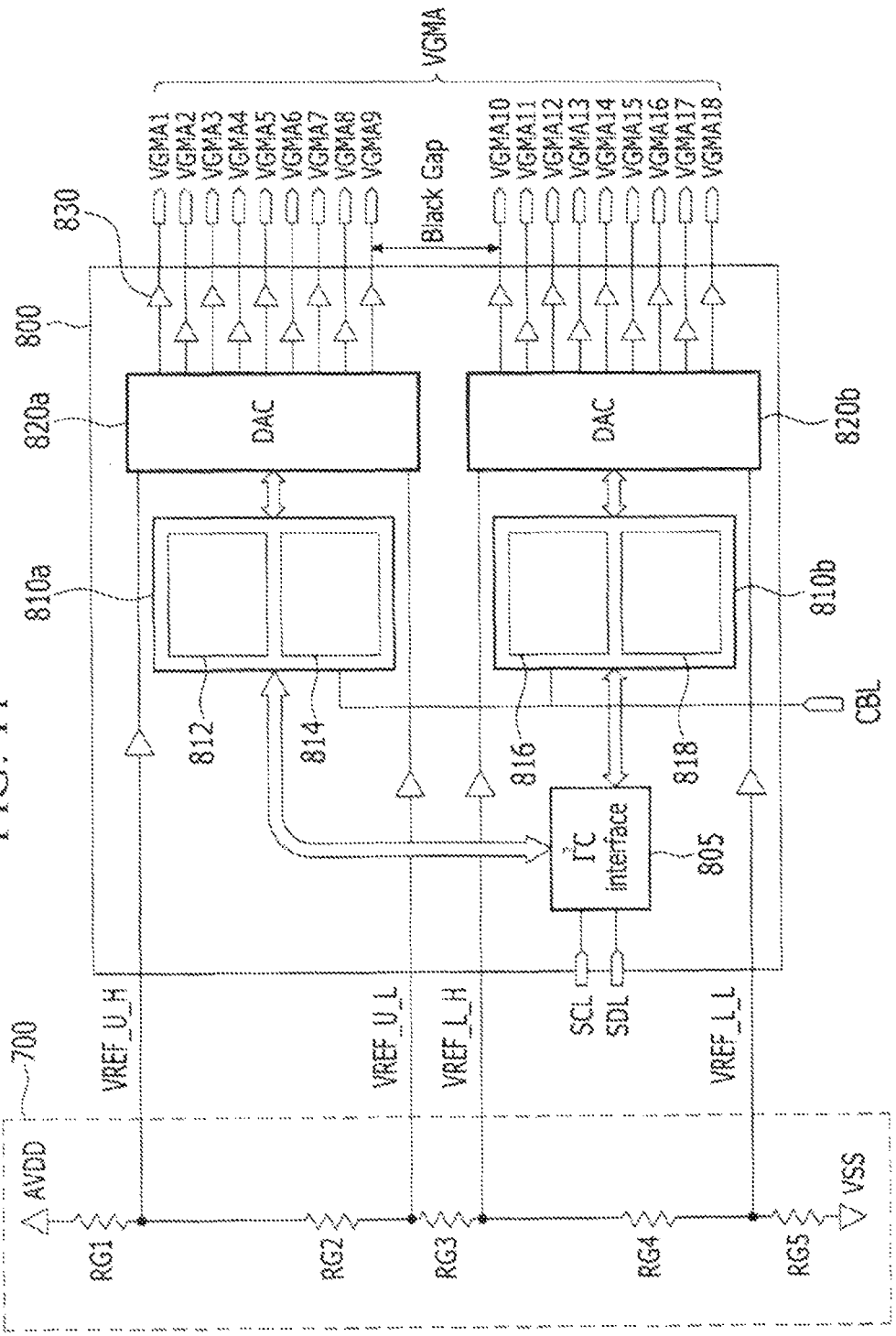

FIG. 11 is a circuit diagram of a reference voltages generator 700 and a gamma reference voltages generator 800 of a 3D image display device according to another exemplary embodiment.

Referring to FIG. 11, the reference voltages generator 700 of the 3D image display device according to the exemplary embodiment includes a resistor column including a plurality of resistors RG1-RG5 coupled in series between the high potential power source voltage AVDD and the low potential power source voltage VSS.

The reference voltages generator 700 divides the voltage between the high potential power source voltage AVDD and the low potential power source voltage VSS by using the resistors RG1-RG5 of the resistor column to generate at least two upper reference voltages VREF_U_H and VREF_U_L and at least two lower reference voltages VREF_L_H and VREF_L_L. The upper reference voltages VREF_U_H and VREF_U_L may be higher than the common voltage Vcom, and the lower reference voltages VREF_L_H and VREF_L_L may be lower than the common voltage Vcom.

The upper reference voltages VREF_U_H and VREF_U_L and the lower reference voltages VREF_L_H and VREF_L_L together form a plurality of reference voltages VREF. The magnitude and the sequence of the upper and lower reference voltages VREF_U_H, VREF_U_L, VREF_L_H, and VREF_L_L are determined according to the magnitude of the resistors RG1-RG5. The magnitude of the resistors RG1-RG5 may be controlled according to design conditions.

The upper and lower reference voltages VREF_U_H, VREF_U_L, VREF_L_H, and VREF_L_L are input to the gamma reference voltage generator 800 or the data lines driver 500.

The gamma reference voltages generator 800 includes a digital interface receiver 805, an upper memory 810a and a lower memory 810b, an upper digital-to-analog convertor (DAC) 820a connected to the upper memory 810a, a lower digital-to-analog convertor 820b connected to the lower memory 810b, and a plurality of analog output buffers 830.

The upper reference voltages VREF_U_H and VREF_U_L input from the reference voltage generator 700 are input to the upper digital-analog convertor 820a, and the lower reference voltage VREF_L_H and VREF_L_L are input to the lower digital-analog convertor 820b.

The upper memory 810a may include a plurality of memory banks 812 and 814, and the lower memory 810b may include a plurality of memory banks 816 and 818. The number of the memory banks included in the upper memory 810a and the lower memory 810b may be, for example, two.

The gamma reference voltage generator 800 receives the gamma data signal SDA and the clock signal SCL through the interface receiver 805, and stores the gamma data transmitted by the gamma data signal SDA to the upper memory 810a and the lower memory 810b.

At this time, the gamma data may include first gamma data that is appropriate for the 3D driving method in which the black image display frame is not inserted between the left eye image display frame and the right eye image display frame, for example, the LHRH driving method, the LLRR driving method, or the driving method having substantially the same 3D display characteristic as them, and a second gamma data that is appropriate for the LBRB driving method or the driving method having substantially the same 3D display characteristic as the LBRB driving method. The first gamma data may be stored to the first memory bank 812 of the upper memory 810a, and the second gamma data may be stored to the second memory bank 814 of the upper memory 810a. Likewise, the first gamma data may be stored to the first memory bank 816 of the lower memory 810b, and the second gamma data may be stored to the second memory bank 818 of the lower memory 810b.

In this case, the memory 610 connected to the signal controller 600 may include at least two banks respectively storing the first gamma data and the second gamma data.

The upper and lower memories 810a and 810b may receive the black gap control signal CBL from the signal controller 600, and may responsively select one of the first memory banks 812 and 816 or the second memory banks 814 and 818 according to the black gap control signal CBL. For example, when the black gap control signal CBL is the high level, the first memory banks 812 and 816 storing the first gamma data are selected, while when the black gap control signal CBL is the low level, the second memory banks 814 and 818 storing the second gamma data are selected. The first gamma data or the second gamma data selected according to the black gap control signal CBL is input to the upper digital-analog convertor 820a and the lower digital-analog convertor 820b.

The upper digital-analog convertor 820a and the lower digital-analog convertor 820b convert the selected first gamma data or second gamma data into the respective analog voltages.

For example, the upper digital-analog convertor 820a may include a plurality of resistors coupled in series between two upper reference voltages VREF_U_H and VREF_U_L. The upper digital-analog convertor 820a selects and outputs voltages of nodes between a plurality of resistors based on the gamma data of the memory banks 812 and 814 selected in the upper memory 810a, and the output voltages are amplified through the analog output buffers 830 to be output as a corresponding plurality of positive gamma reference voltages VGMA1-VGMA9.

Likewise, the lower digital-analog convertor 820b may include a plurality of resistors coupled in series between two lower reference voltages VREF_L_H and VREF_L_L. The lower digital-analog convertor 820b selects and outputs the voltages of the nodes between a plurality of resistors based on the gamma data of the memory banks 816 and 818 selected in the lower memory 810b, and the output voltages are amplified through the output buffers 830 to be output as a corresponding plurality of negative gamma reference voltages VGMA10-VGMA18.

The number of the gamma reference voltages VGMA1-VGMA18 is not limited thereto, and may be changed according to the design conditions of the 3D image display device.

A plurality of gamma reference voltages VGMA are changed according to the gamma data selected in the upper and lower memories 810a and 810b, and accordingly, the black gap as the region between the lowest gamma reference voltage among the positive gamma reference voltages and the highest gamma reference voltage among the negative gamma reference voltages is also changed. That is, the first gamma data may be predetermined for the black gap to be first black gap 'A', and the second gamma data may be predetermined for the black gap to be the second black gap 'B' different from the first black gap 'A'. The second black gap 'B' may be larger than the first black gap 'A'.

While the present disclosure of invention has been described in connection with what is presently considered to be practical exemplary embodiments, it is to be understood that the present teachings are not limited to the disclosed embodiments, but, on the contrary, the teachings are intended to cover various modifications and equivalent arrangements included within the spirit and scope of the disclosure.

What is claimed is:

1. A 3D-capable image display device comprising:
    a display panel including a plurality of pixels and a plurality of data lines;
    a gamma reference voltages generator configured for generating a plurality of gamma reference voltages including a plurality of positive gamma reference voltages and a plurality of negative gamma reference voltages, where polarity is relative to a provided common voltage;
    a data lines driver configured for converting an image signal into corresponding data line drive voltages using a plurality of gray voltages generated based on the plurality of gamma reference voltages and for applying the data line drive voltages to corresponding ones of the data lines; and
    a signal controller configured for operating according to a mode selection signal including information indicative of one of a plurality of different 3D driving methods and for controlling the gamma reference voltages generator and the data lines driver,
    wherein when a gap between the plurality of positive gamma reference voltages and the plurality of negative gamma reference voltages is referred to as a black gap, and the black gap is caused to be a first black gap when the 3D driving method is a first driving method, and the black gap is caused to be a second black gap different from the first black gap when the 3D driving method is a second driving method different from the first driving method.

2. The device of claim 1, wherein
    the signal controller is configured to generate a black gap control signal to control the black gap based on the mode selection signal.

3. The device of claim 2, further comprising
    a reference voltages generator configured for generating the plurality of reference voltages and supplying the plurality of reference voltages to the gamma reference voltages generator,
    wherein the reference voltages generator receives the black gap control signal to control the black gap.

4. The device of claim 3, wherein
    the reference voltages generator includes:
    a plurality of voltage-dividing resistors connected between a first power source voltage and a second power source voltage; and
    a first resistor and a first transistor connected between both terminals of a middle resistor positioned in the middle among the plurality of voltage-dividing resistors.

5. The device of claim 4, wherein
the first transistor includes a control terminal receiving the black gap control signal, and
the first transistor is turned on or turned off according to the black gap control signal to thereby control a level of at least a portion among the plurality of reference voltages.

6. The device of claim 5, wherein:
the first driving method includes an LHRH driving method;
the second driving method includes an LBRB driving method; and
the second black gap is larger than the first black gap.

7. The device of claim 2, further comprising
a reference voltages generator including a plurality of voltage-dividing resistors connected between a first power source voltage and a second power source voltage and configured for generating a plurality of reference voltages using the plurality of voltage-dividing resistors and inputting the plurality of reference voltages to the gamma reference voltages generator,
wherein the gamma reference voltages generator includes a first resistor and a first transistor connected between both terminals of a middle resistor positioned in the middle among the plurality of voltage-dividing resistors.

8. The device of claim 7, wherein
the first transistor includes a control terminal receiving the black gap control signal, and
the first transistor is turned on or turned off according to the black gap control signal to control a level of at least a portion among the plurality of gamma reference voltages.

9. The device of claim 8, wherein:
the first driving method includes an LHRH driving method;
the second driving method includes an LBRB driving method; and
the second black gap is larger than the first black gap.

10. The device of claim 2, further comprising
a reference voltages generator configured for generating a plurality of reference voltages and supplying the plurality of reference voltages to the gamma reference voltages generator,
wherein the gamma reference voltage generator includes
an upper memory storing positive gamma data and a lower memory storing negative gamma data, and
a first convertor operatively coupled and configured for converting the positive gamma data into corresponding analog voltages and a second convertor operatively coupled and configured for converting the negative gamma data into corresponding analog voltages,
wherein the upper memory and the lower memory each include a first memory bank and a second memory bank,
the first memory bank stores first gamma data, and
the second memory bank stores second gamma data different from the first gamma data.

11. The device of claim 10, wherein
one of the first memory bank and the second memory bank is selected according to the black gap control signal, and the selected one of the first gamma data or the second gamma data is input to the first and second convertors.

12. The device of claim 11, wherein
the black gap of the plurality of gamma reference voltages generated according to the first gamma data is different from the black gap of the plurality of gamma reference voltages generated according to the second gamma data.

13. The device of claim 12, wherein:
the first driving method includes an LHRH driving method;
the second driving method includes an LBRB driving method; and
the second black gap is larger than the first black gap.

14. A method of driving a 3D-capable image display device including a display panel having a plurality of pixels and a plurality of data lines, a gamma reference voltages generator, and a data lines driver connected to the data lines, and a signal controller, the method comprising:
receiving a mode selection signal including information for a commanded or pre-specified 3D driving method and generating a black gap control signal based on the mode selection signal by a signal controller;
generating a plurality of gamma reference voltages including a plurality of positive gamma reference voltages and a plurality of negative gamma reference voltages by the gamma reference voltages generator; and
converting an image signal into a plurality of data line drive voltages by using a plurality of gray voltages generated based on the plurality of gamma reference voltages by the data lines driver,
wherein when a gap between the plurality of positive gamma reference voltages and the plurality of negative gamma reference voltages is referred to as a black gap, the black gap is a first black gap when the 3D driving method is a first driving method, and the black gap is a second black gap different from the first black gap when the 3D driving method is a second driving method different from the first driving method.

15. The method of claim 14, wherein
the 3D image display device includes a reference voltages generator a including a plurality of voltage-dividing resistors connected between a first power source voltage and a second power source voltage and generating a plurality of reference voltages by using the plurality of voltage-dividing resistors and inputting the plurality of reference voltages to the gamma reference voltage generator, and
the reference voltages generator further includes a first resistor and a first transistor connected between both terminals of a middle resistor positioned in the middle among the plurality of voltage-dividing resistors.

16. The method of claim 15, further comprising
controlling the black gap by turning on or turning off the first transistor according to the black gap control signal.

17. The method of claim 14, wherein
the 3D image display device includes a reference voltages generator a including a plurality of voltage-dividing resistors connected between a first power source voltage and a second power source voltage and generating a plurality of reference voltages by using the plurality of voltage-dividing resistors and inputting the plurality of reference voltages to the gamma reference voltages generator, and
the gamma reference voltages generator includes a first resistor and a first transistor connected between both terminals of a middle resistor positioned in the middle among the plurality of voltage-dividing resistors.

18. The method of claim 17, further comprising
turning on or turning off the first transistor according to the black gap control signal to control the black gap.

19. The method of claim 14, wherein
the generating of the plurality of gamma reference voltages includes:
storing first gamma data into a first memory bank respectively included in an upper memory and a lower memory, the upper memory and the lower memory being included in the gamma reference voltages generator;

storing second gamma data different from the first gamma data into a second memory bank respectively included in the upper memory and the lower memory;

selecting one of the first memory bank and the second memory bank according to the black gap control signal; and converting the first gamma data or the second gamma data stored in the selected one of the first memory bank or the second memory bank into corresponding analog voltages.

20. The method of claim 14, wherein:

the first driving method includes an LHRH driving method;

the second driving method is an LBRB driving method; and the second black gap is larger than the first black gap.

* * * * *